United States Patent [19]

Broecker

[11] Patent Number: 4,686,202

[45] Date of Patent: Aug. 11, 1987

[54] PREPARATION OF CATALYSTS FOR THE DETOXIFICATION OF WASTE GASES

[75] Inventor: Franz J. Broecker, Ludwigshafen, Fed. Rep. of Germany

[73] Assignee: BASF Aktiengesellschaft, Ludwigshafen, Fed. Rep. of Germany

[21] Appl. No.: 842,994

[22] Filed: Mar. 24, 1986

[30] Foreign Application Priority Data

Apr. 17, 1985 [DE] Fed. Rep. of Germany ....... 3513726

[51] Int. Cl.$^4$ ............................................. B01J 35/06
[52] U.S. Cl. .................................. 502/300; 502/527; 423/213.5
[58] Field of Search .............................. 502/527, 300; 423/213.5

[56] References Cited

U.S. PATENT DOCUMENTS

| | | | |
|---|---|---|---|
| 3,873,469 | 3/1975 | Foster et al. | 252/455 |
| 3,944,504 | 3/1976 | Ford et al. | 502/527 X |
| 3,966,645 | 6/1976 | Cairns et al. | 502/527 X |
| 4,111,849 | 9/1978 | Fedor | 502/527 X |
| 4,333,896 | 6/1982 | Cunningham et al. | 264/140.5 |
| 4,364,888 | 12/1982 | Levin | 264/177 |
| 4,450,244 | 5/1984 | Domesle et al. | 502/185 |

FOREIGN PATENT DOCUMENTS

| | | |
|---|---|---|
| 0034179 | 3/1980 | European Pat. Off. . |
| 0075124 | 3/1983 | European Pat. Off. . |
| 2256195 | 5/1973 | Fed. Rep. of Germany . |
| 2317560 | 10/1973 | Fed. Rep. of Germany . |
| 1414133 | 11/1971 | United Kingdom . |
| 1371082 | 10/1974 | United Kingdom . |
| 2073042 | 3/1981 | United Kingdom . |

Primary Examiner—W. J. Shine
Attorney, Agent, or Firm—Keil & Weinkauf

[57] ABSTRACT

Catalysts, in particular for the detoxification of automobile exhaust gases, are prepared by a process in which the active components and the promoters are applied onto a carrier by vapor deposition under very greatly reduced pressure. The carriers used are advantageously in the form of nets or woven fabrics.

The catalyst fabrics coated by vapor deposition are pressed together to form catalyst packets for installation in the reactor, and the shape of the catalyst packets is adapted to the flow conditions in the reactor.

13 Claims, 1 Drawing Figure

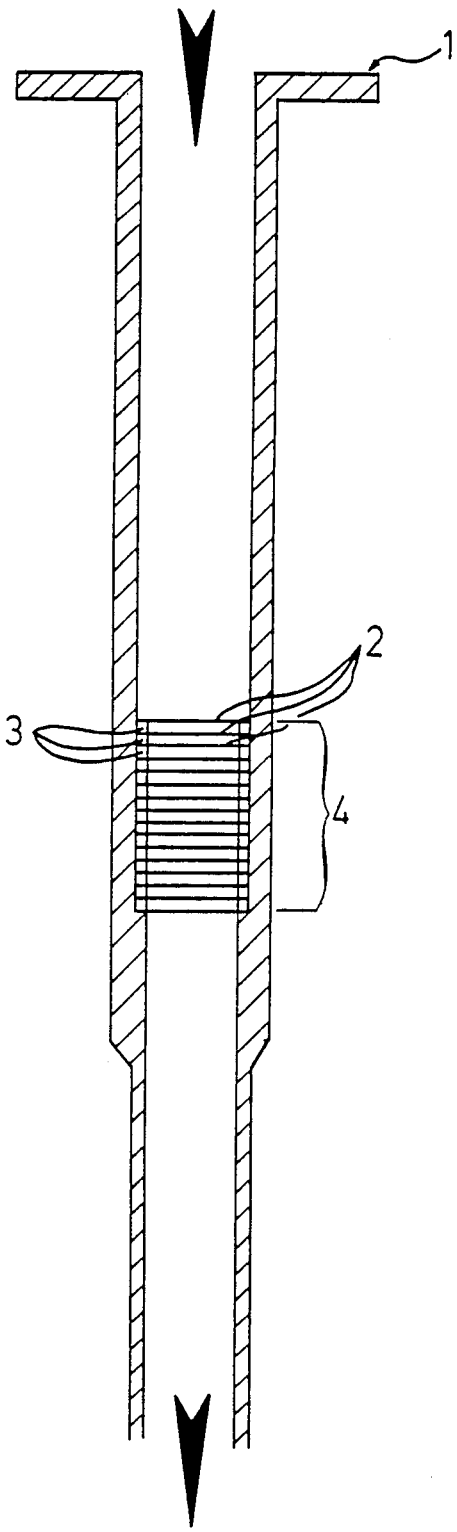

PREPARATION OF CATALYSTS FOR THE DETOXIFICATION OF WASTE GASES

Substantial efforts have been made, particularly in connection with the detoxification of automobile exhaust gases, to develop catalysts which have low pressure losses, are thermally stable and possess sufficient activity (European Pat. No. 34,179). Recently, monolithic carriers which possess flow channels of different shapes have preferably been used for this purpose. These carriers having a honeycomb structure are very expensive to prepare. British Pat. No. 1,371,082 describes such a process for the preparation of carriers which have honeycomb structures.

Processes for the preparation of monolithic structures by extrusion are described in, for example, U.S. Pat. Nos. 4,364,888 and 4,333,896, etc. All descriptions indicate the technically very complicated procedure required for the preparation of monolithic structures. Apart from the preparation of the monolithic carriers, the application of the active components is another problem in the preparation of these catalysts. This too entails methods which are relatively complicated technically. For example, German Laid-Open Application No. DOS 2,256,195 described a process in which the carrier is first coated with an inert oxide layer, after which the active components are applied by impregnation. European Pat. No. 75,124 describes a catalyst for the combustion of harmful substances present in exhaust gases from internal combustion engines operated with alcohol. The catalyst consists of a metal carrier, a coating of active alumina deposited on top of this carrier, and from 0.03 to 3% by weight of palladium deposited on top of the alumina. The oxide layer is produced by immersion of the carrier in a dispersion of active alumina, followed by heating at elevated temperatures (700° C.). The noble metal is then applied onto this oxide layer by immersion in a palladium salt solution, and the catayst is obtained after drying and reduction at 500° C.

German Laid-Open Application No. DOS 2,317,560 describes a catalyst which consists of a monolithic honeycomb as the carrier, a base layer of $SiO_2$ and/or $Al_2O_3$, and one or more top layers of $SiO_2$, $TiO_2$, $ZrO_2$, $SnO_2$ and/or $MnO_2$, the top layers being produced by impregnation with alkali metal oxides followed by hydrolysis of these compounds. Finally, the active component is applied on top of this top layer by impregnation. The active components are given as 0.2% by weight of Pt metals as well as Cu, Cr and Fe. In this process, the production of monolithic waste gas catalysts entails a large number of individual steps and expensive impregnation and calcination procedures.

It is an object of the present invention to provide a process for the preparation of catalysts which is substantially easier to carry out and at the same time permits a reduction in the noble metal content of the catalyst, particularly in the case of the catalysts for automobile exhaust gases.

I have found that this object is achieved, and that the above disadvantages of the conventional processes are avoided, if, in the preparation of catalysts for the detoxification of waste gases, the active components and the promoters are vaporized under reduced pressure and applied onto carriers in the form of nets or woven fabrics by vapor deposition under reduced pressure.

Advantageously, the woven fabric coated with the catalyst metal by vapor deposition is pressed together to form catalyst packets for installation in the reactor, and the shape of the catalyst packet is adapted to the flow conditions in the reactor.

The woven fabrics used can be, for example, woven wire fabrics or woven fabrics of inorganic materials, such as $Al_2O_3$ or $SiO_2$, or combinations of the two. However, it is also possible to use woven fabrics of carbon fibers or of plastics.

In the process according to the invention, catalyst manufacture is substantially simplified, and the possibility of preparing very thin layers permits the content of active noble metal components, eg. platinum, to be considerably reduced.

The carriers used can be woven fabrics consisting of various weavable metal wires, such as iron, spring steel, copper, brass, phosphor bronze, pure nickel, monel metal, aluminum, silver, nickel silver, nickel, chrome nickel, chrome steel, acid-resistant and highly heat-resistant stainless chrome nickel steels and titanium. Woven fabrics of inorganic materials, such as $Al_2O_3$ and/or $SiO_2$, can also be used, while synthetic wires made of plastics such as nylons, polyesters, polyvinyls, polyethylene, polypropylene, polytetrafluoroethylene, etc. can be woven into fabrics and used as carriers. Highly heat-resistant stainless steels and woven fabrics made of heat-resistant inorganic fibers, eg. ceramic fibers, are particularly suitable for the detoxification of automobile exhaust gases. Fabrics having different types of weaves, such as plain-weave fabrics, twills, braids, fiveshaft satin weaves and other specially bonded fabrics, can be employed. Moldings of knitted wire, eg. Raschig rings, can also be used.

The woven fabrics can advantageously be coated with thin layers of active components and promoters or stabilizers by vapor deposition under reduced pressure. Thin layers are coatings ranging from a few Angstroms to not more than 1 $\mu$m. Prior to the thin-layer coatings of active components by vapor deposition, the woven fabric carrier can be coated with a heat-resistant compound which does not react with the woven fabric.

Various methods, for example thermal vaporization, flash vaporization, cathode sputtering or a combination of thermal vaporization or cathode sputtering, can be used for vapor deposition under reduced pressure. Thermal vaporization can be effected by direct or indirect electrical heating. Electron beam vaporization may also be employed. In this method, the substance to be vaporized is placed in a water-cooled crucible and heated superficially with an electron beam to a temperature which permits even high-melting metals and dielectrics to be vaporized. The selective addition of suitable amounts of reactive gases to the residual gas results in chemical reactions during production of the layer; these chemical reactions may result in, for example, the formation of oxides, nitrides or carbides.

These methods can be used to dope the catalyst selectively and optimally with compounds which act as promoters and stabilizers. Even stable compounds having a simple structure can be vaporized directly and without significant decomposition. Alloys are preferably employed by flash vaporization.

In the novel process a woven fabric can be coated batchwise or continuously in a reduced-pressure vapor deposition unit, for example by heating the active component to be applied, eg. a noble metal, under reduced pressure of from $10^{-2}$ to $10^{-10}$, preferably from $10^{-4}$ to $10^{-8}$ mm Hg by means of an electron beam to a sufficient extent to vaporize the metal from the water-cooled crucible and deposit it onto the carrier. The carrier fabric is advantageously arranged so that a very large part of the vapor stream condenses on the carrier. By means of an installed winding machine, the woven fabric can be coated continuously. Knitted wire fabrics, eg. Raschig rings of fine wires, are introduced into a rotating cage-like drum for bulk material and coated therein by vapor deposition.

In contrast to the conventional uses of the vapor deposition technique in the optical and electrical industries where high purity of the carrier and vaporized materials, a particular condensation temperature at the carrier and a certain rate of vapor deposition are required because defects in the deposited films greatly influence the optical, electrical and magnetic properties, and a very expensive procedure is necessary to ensure reproducible production of such films, the aim in the novel process for the production of catalysts is to produce very irregular polycrystalline layers containing defects. For this reason, particularly good vacuum conditions are not usually necessary. Furthermore, an attempt is made to obtain the active components in a finely crystalline form by alternate vapor deposition of the active components and the structural promoters.

In the novel process, the catalyst can be built up systematically, for example in a vapor deposition unit which possesses a 4-cavity crucible in which four different materials can be vaporized alternately. For example, the carrier can first be coated with an oxide layer by vapor deposition, and the active components applied on top of this layer. It is also possible to produce a plurality of alternate layers of the active components and promoters. By permitting a reactive gas to enter the receptacles, promoter layers consisting of oxides or other compounds can be produced. Intermediate heating procedures may also be employed. It is therefore possible for all the individual steps required for producing a complex catalyst system to be carried out in one operation.

The woven fabric coated in this manner, ie. the actual catalyst material, can subsequently be shaped into catalyst cells. A very simple catalyst cell for a tube reactor consists of catalyst fabrics punched into circular shapes, which are stacked one on top of the other with spacer rings. The individual catalyst nets can also be mounted in frames and combined to form any desired cylindrical building block, ie. a catalyst cell. This complete catalyst cell can then be installed in a tube reactor. With this catalyst arrangement, the reaction takes place particularly smoothly since uniform flow is permitted. However, the catalyst fabric can also be rolled up like corrugated board or shaped in some other way and converted to catalyst cells. Combination with filters is also possible. For the detoxification of automobile exhaust gases, the catalyst cell can be shaped to provide sound insulation at the same time. The possibility of producing catalyst cells of any desired shape means that exhaust gas treatment can also be carried out for motorcycles, lawn-mowers and other machines operated with gasoline, this being done by inserting the catalyst cells in the existing exhaust system. However, because of the low pressure loss, the installation of such catalyst cells is also advantageous for industrial waste gases. In this connection, the catalyst cells can easily be combined with waste gas filters.

Automobile exhaust gases are preferably purified using three-way catalysts. These catalysts oxidize CO and hydrocarbons and reduce $NO_x$ to nitrogen.

The active components of these transformation reactions differ from one another. Noble metals, such as Pt, Pd, Rh and Ir, have proven particularly useful in the oxidation of CO and hydrocarbons.

The reduction of $NO_x$ is assumed to involve the following reaction steps:

$$2NO + 5H_2 \rightarrow 2NH_3 + 2H_2O \tag{1}$$

$$2NH_3 \rightarrow N_2 + 3H_2 \tag{2}$$

The reduction of NO to $NH_3$ is catalyzed particularly well by active components such as Pt, Pd and Cu. The decomposition of ammonia to nitrogen and hydrogen is not sufficiently catalyzed by these elements. Nickel is a particularly useful catalyst for this purpose.

For the reduction of $NO_x$ to nitrogen, for example, combinations of noble metals, such as Pt, Pd, Rh and Ir, with nickel and/or copper are suitable.

In the conventional catalysts for engine exhaust gases, the catalytically active substances are always applied together onto a carrier, which is generally monolithic. Since the active components are applied by impregnation with solutions, some of the individual components are covered by others, so that their activity, which is fully displayed only at the catalyst interface, is restricted.

The novel process makes it possible to avoid this overlapping of the active components and hence to achieve optimum activities with very small amounts of active components. In a particularly advantageous embodiment, the catalyst packets produced correspond to the reaction scheme. For example, catalyst nets coated with Pt, Pd, Rh or Ir by vapor deposition and those which carry nickel as the active component can be combined to form these catalyst packets. To do this, the active components are first applied in very finely divided form onto separate, generally pretreated carrier nets, and the individual catalyst nets are then combined in an optimum manner to produce a catalyst packet. In another method, the active components are applied side by side onto the carrier by vapor deposition, this being done by introducing masks into the jet of vapor.

The novel process is also useful for producing catalysts which can be installed directly in the combustion chamber of the engine, for example on the piston and/or above the piston in the cylinder. For such catalysts, highly heat-resistant stainless steel nets or foils are particularly useful since they can be welded or bonded directly to the engine material in the combustion chamber. Particularly suitable materials for the carrier nets or the foils are stainless steel alloys which contain Cr and Al, Cr, Mn and Al, Cr and Si, Cr and Ti, Cr, Mo and V, Cr, Mn, Mo, V, Nb and N, Cr, Ni and Si, or Cr, Ni, Al and Ti as alloy components. Surprisingly, particularly good results are obtained with woven stainless steel fabrics consisting of heat-resistant alloys containing chromium and aluminum when these alloys are heated at from 900° to 1000° C. for from 1 to 15, preferably from 2 to 8, hours prior to vapor deposition. If this preheated material is then coated by vapor deposition, highly active catalyst fabrics are obtained. The production of base layers of oxides or oxide mixtures on the carrier is also advantageous. These base layers preferably consist of oxides of the following metals: B, Al, Ba, Sr, Ca, Mg, Be, Si, Zn, Sn, Mn, Cr, V, W, Mo, Ti, Zr, Sc, Y, La, Ce or other rare earth metals. These oxide layers can be produced by direct vapor deposition of the oxides, or by vapor deposition of the metal followed by oxidation. Furthermore, oxide compounds, eg. spinels, can be produced on the carrier surface by heating.

By reactive vaporization in a reactive residual gas atmosphere, it is also possible to coat the carrier surface with compounds such as nitrides or carbides.

The active components can be applied by vapor deposition onto the carrier surfaces stabilized in this manner. In addition to the noble metals Pt, Pd, Rh and Ir, the metals Ni, Co, Fe, Cr and Cu are also suitable.

By installing the catalyst directly in the combustion chamber, it is possible to effect complete combustion with an extremely poor fuel mixture. This reduces the formation of harmful substances to a minimum and results in optimum purification of the exhaust gas. For installation in the combustion chamber, the noble metals Pt, Pd, Rh and Ir are particularly useful. These are applied by vapor deposition onto the heat-resistant metal carriers, which are preferably provided with an appropriate oxide base layer.

The production of the novel catalysts by vapor deposition has the great advantage that maximum activity is achieved with layers as thin as a few tenths of a nanometer. This results in a substantial reduction in the noble metal content of the catalyst compared with impregnated catalysts. In the catalysts for automobile exhaust gases, the noble metal contents are from 0.005 to 0.8, preferably from 0.02 to 0.5, g of noble metal per l of catalyst.

The Examples which follow show that, because the active components are finely divided, the novel catalysts possess better activity than monolithic structures and other inpregnated catalysts.

BRIEF DESCRIPTION OF THE DRAWING

The drawing is a schematic sectional view of a tube reactor containing the catalyst packet described below in Example 1.

EXAMPLE 1

A stainless steel woven fabric is coated with a 50 Å thick platinum layer in a vapor deposition apparatus under a reduced pressure of $5 \times 10^{-7}$ mm Hg. The platinum is present in a cooled copper crucible and is vaporized by means of an electron beam. Circular disks are then punched from the fabric and installed in the middle of the tube reactor (1) shown in the FIGURE of the drawing. Spacer rings (3) are placed between the individual nets (2). The resulting net packet (4) comprising 27 nets occupies a volume of 4.9 cm$^3$ in the reactor.

The usefulness of the catalyst nets for oxidizing CO is tested using a waste gas containing 930 ppm of CO in air, a space velocity of 10,968 [h$^{-1}$], based on the empty reactor and 25° C. To do this, the reactor is immersed in a salt bath and in this way heated isothermally from outside. The catalyst activity is characterized by the activity $A_i$ defined as the natural logarithm of the ratio of the concentration of the component i upstream of the catalyst to that downstream of the catalyst:

$$A_i = \ln \frac{(X_i) \text{ inlet}}{(X_i) \text{ outlet}}$$

The novel catalyst is compared with a commercial monolithic catalyst for the detoxification of automobile exhaust gases. Results for various salt bath temperatures are shown in Table 1. The space velocity of all experiments is constant at 10.968 [h$^{-1}$], based on the empty reactor and 25° C.

TABLE 1

| Catalyst | Activity $A_i$ in the CO test | | |
|---|---|---|---|
| | 250° C. | 350° C. | 450° C. |
| Novel catalyst | 6.84 | 7.53 | 8.44 |
| Monolithic catalyst | 5.74 | 6.14 | 6.84 |

The measurements show that the activity displayed by the monolithic catalyst at 450° C. is reached by the novel catalyst at as low as 250° C., which is 200° C. lower.

EXAMPLE 2

A stainless steel net is coated by vapor deposition with a 500 Å thick platinum layer and then with 50 Å of rhodium, as described in Example 1. A net packet is produced from the net disks as described in Example 1, and this packet is installed in the reactor. To investigate the activity in the removal of hydrocarbons from waste gases, a waste gas consisting of 168 ppm of propane and air is passed over the catalyst at a space velocity of 11,000 h$^{-1}$ at various temperatures. The results are compared with the monolithic catalyst tested in Example 1 and an impregnated catalyst containing 0.05% of Pt on α-Al$_2$O$_3$. The results of the activity tests are reproduced in Table 2.

TABLE 2

| Catalyst | Activity $A_i$ in the propane test | | |
|---|---|---|---|
| | 250° C. | 350° C. | 450° C. |
| Novel catalyst | 0.21 | 0.74 | 3.51 |
| Monolithic catalyst | 0.11 | 0.33 | 2.12 |
| Impregnated catalyst, 0.05% of Pt on AL$_2$O$_3$ | 0.10 | 0.34 | 1.59 |

In this test too, the novel catalyst exhibits substantially greater activity than the comparative catalysts.

EXAMPLE 3

A stainless steel woven fabric is coated first with 250 Å of platinum and then with 250 Å of rhodium, this being done by vapor deposition as described in Example 1. The product is converted to a catalyst net packet, and the latter is tested and compared with the monolithic catalyst using the same catalyst volumes. For the activity tests, a waste gas consisting of 994 ppm of carbon monoxide, 193 ppm of propane and air is passed over the catalyst at a constant space velocity of 10,000 [h$^{-1}$], based on an empty space and 25° C., at various temperatures. The results are summarized in Table 3.

TABLE 3

| Catalyst | Activity $A_i$ for CO | | | Activity $A_i$ for C$_3$H$_8$ | | |
|---|---|---|---|---|---|---|
| | 250° C. | 350° C. | 450° C. | 250° C. | 350° C. | 450° C. |
| Novel catalyst, 250 Å of Pt; 250 Å of Rh | 6.9 | 7.6 | 8.5 | 0.27 | 3.47 | 3.70 |
| Monolithic catalyst | 5.7 | 6.1 | 6.5 | 0.13 | 0.37 | 2.23 |

In this Example, both carbon monoxide and propane are substantially removed from the gas by oxidation.

This Example too illustrates the substantial superiority of the catalyst prepared according to the invention.

EXAMPLE 4

The stainless steel woven fabric (material No. 1.4767) is heated in the air for 5 hours at 900° C. After cooling, the woven fabric is coated first with 100 Å of platinum and then with 10 Å of rhodium by vapor deposition as described in Example 1. The catalyst thus prepared is subjected to an activity test as described in Example 3. In this test, it is found that 994 ppm of carbon monoxide are converted quantitatively as low at as 250° C. For the propane, the conversion is 19.7% at 250° C., 52.3% at 350° C. and quantitative at 450° C., ie. propane is no longer detectable in the waste gas.

I claim:

1. A process for the preparation of a catalyst for the detoxification of waste gases, wherein the active catalyst components and the promoters are vaporized under reduced pressure and applied onto a carrier in the form of a net or woven fabric by vapor deposition under reduced pressure and the net or woven fabric coated with the catalyst metal by vapor deposition is then shaped to form catalyst packets.

2. The process as of claim 1, wherein woven fabric coated with the catalyst metal by vapor deposition is pressed together to form catalyst packets for installation in the reactor, and a shape of the catalyst packets is adapted to the flow conditions in the reactor.

3. The process of claim 1, wherein woven wire fabric is used as the carrier.

4. The process of claim 1, wherein a woven fabric of an inorganic material is used as the carrier.

5. The process of claim 1, wherein a woven fabric of carbon fibers is used as the carrier.

6. The process of claim 1, wherein a woven fabric of plastic is used as the carrier.

7. The process of claim 1, wherein the carrier in the form of a net or woven fabric is first coated by vapor deposition with an oxidizable metal, the metal deposited is oxidized with oxygen and/or air, and the active component is then applied by vapor deposition onto the oxide layer.

8. The process of claim 1, wherein a plurality of layers of different thicknesses are produced by vapor deposition of various metals.

9. The process of claim 8, wherein the layers are converted to alloys or compounds by heating at elevated temperatures.

10. The process of claim 1, wherein, prior to vapor deposition of the active components, the carrier in the form of a woven fabric is coated with a heat-resistant compound which does not react with the woven fabric.

11. A process for the preparation of a three-way catalyst for the detoxification of waste gases, as defined in claim 1, wherein the active components for the individual reaction steps are applied in very finely divided form onto separate carrier nets, after which a catalyst net packet is produced by optimum combination of the individual nets containing different components.

12. A process for the preparation of a catalyst for the detoxification of automobile exhaust gases as defined in claim 1, wherein highly heat-resistant stainless steel woven fabric or net is coated with the active components by vapor deposition under reduced pressure, and these catalysts are installed directly in the combustion chamber of the engine.

13. The process of claim 12, wherein, prior to vapor deposition of the active components, the carrier is coated with an oxide layer and/or with spinels produced on the carrier surface by heating.

* * * * *